US012700723B2

(12) United States Patent
Chien et al.

(10) Patent No.: US 12,700,723 B2
(45) Date of Patent: Aug. 4, 2026

(54) RETRACTABLE CABLE DEVICE

(71) Applicant: Cheng Uei Precision Industry Co., LTD., New Taipei City (TW)

(72) Inventors: Kuang-Mo Chien, New Taipei City (TW); Chien-Chung Wang, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 490 days.

(21) Appl. No.: 18/481,229

(22) Filed: Oct. 4, 2023

(65) Prior Publication Data

US 2024/0222950 A1      Jul. 4, 2024

(30) Foreign Application Priority Data

Jan. 4, 2023    (CN) .......................... 202320045182.9

(51) Int. Cl.
H02G 11/02          (2006.01)
(52) U.S. Cl.
CPC ................................... H02G 11/02 (2013.01)
(58) Field of Classification Search
None
See application file for complete search history.

(56) References Cited

U.S. PATENT DOCUMENTS

| | | | | | |
|---|---|---|---|---|---|
| 2,225,859 | A | * | 12/1940 | Cox ......................... | B67D 7/40 |
| | | | | | 137/355.25 |
| 2,503,018 | A | * | 4/1950 | Wittman .............. | H02G 11/003 |
| | | | | | 242/390.4 |
| 2,648,052 | A | * | 8/1953 | Graham ................. | H01R 11/14 |
| | | | | | 379/419 |
| 2,875,496 | A | * | 3/1959 | Fox ........................... | F16L 3/01 |
| | | | | | 248/89 |
| 2,984,714 | A | * | 5/1961 | Kunkle .................. | H02G 11/02 |
| | | | | | 191/12 R |
| 3,427,719 | A | * | 2/1969 | Hermstad .............. | A61G 15/16 |
| | | | | | 226/118.3 |
| 3,612,318 | A | * | 10/1971 | Ramsey .................. | B66F 9/205 |
| | | | | | 414/667 |
| 4,174,816 | A | * | 11/1979 | Olson .................... | A61B 90/50 |
| | | | | | 242/272 |
| 5,156,349 | A | * | 10/1992 | Wilson ................. | B65H 75/368 |
| | | | | | 242/388.9 |

(Continued)

FOREIGN PATENT DOCUMENTS

CN          111786207  A      10/2020

*Primary Examiner* — Ross N Gushi
(74) *Attorney, Agent, or Firm* — Cheng-Ju Chiang

(57)          ABSTRACT

A retractable cable device includes a shell, a cable disposed in the shell, a pulley disposed in the shell, a spring assembly disposed in the shell, and a cover covered to the shell. The shell has a bottom board. Two sides of an inner surface of the bottom board extend upward to form two first slide rails. The cable is mounted around the pulley. Two sides of a top surface and two sides of a bottom surface of the pulley are recessed inward to form a plurality of locating grooves. The locating grooves of the bottom surface of the pulley guide the first slide rails of the shell. Two sides of a bottom surface of the cover extend downward to form two second slide rails. The locating grooves of the top surface of the pulley guide the second slide rails of the cover.

20 Claims, 9 Drawing Sheets

(56)                References Cited

U.S. PATENT DOCUMENTS

| | | | | |
|---|---|---|---|---|
| 5,421,530 A * | 6/1995 | Bertagna | B65H 75/44 | |
| | | | 242/388.91 | |
| 5,507,446 A * | 4/1996 | Ditzig | B65H 75/368 | |
| | | | 379/438 | |
| 5,775,354 A * | 7/1998 | Upton | B65H 75/48 | |
| | | | 137/355.23 | |
| 6,143,985 A * | 11/2000 | Knapp | H04N 1/00557 | |
| | | | 174/DIG. 9 | |
| 6,216,834 B1 * | 4/2001 | Steinhovden | H02G 11/00 | |
| | | | 191/12.4 | |
| 7,077,650 B2 * | 7/2006 | Johnstone | A61G 15/18 | |
| | | | 137/355.17 | |
| 8,740,127 B2 * | 6/2014 | Soper | B65H 75/368 | |
| | | | 242/388.9 | |
| 9,056,744 B2 * | 6/2015 | Feldstein | B65H 75/4439 | |
| 9,457,674 B2 * | 10/2016 | Bianco | B60L 53/18 | |
| 9,475,673 B2 * | 10/2016 | Feldstein | B65H 75/368 | |
| 9,516,772 B2 * | 12/2016 | Mangione | H05K 5/0226 | |
| 9,637,347 B2 * | 5/2017 | Savchenko | B65H 75/368 | |
| 9,854,699 B2 * | 12/2017 | Geng | G02B 6/4453 | |
| 9,884,741 B2 * | 2/2018 | Ding | B65H 75/4418 | |
| 10,252,630 B2 * | 4/2019 | Hiebenthal | B60L 53/18 | |
| 11,014,116 B2 * | 5/2021 | Melle | B05B 1/14 | |
| 11,829,201 B2 * | 11/2023 | Cheung | H01R 13/62 | |
| 12,392,171 B1 * | 8/2025 | Tollefson | E05B 73/0011 | |
| 2008/0156922 A1 * | 7/2008 | Rabinowitz | H02G 11/003 | |
| | | | 242/375 | |
| 2014/0001300 A1 * | 1/2014 | Ichihara | H02G 11/00 | |
| | | | 242/388.91 | |
| 2014/0274516 A1 * | 9/2014 | Sugiura | B65H 75/44 | |
| | | | 474/150 | |
| 2016/0089996 A1 * | 3/2016 | Sugiura | B60L 53/14 | |
| | | | 320/109 | |
| 2022/0274801 A1 * | 9/2022 | Gatt | A47B 21/06 | |
| 2025/0236189 A1 * | 7/2025 | Jaeker | H02G 11/003 | |

* cited by examiner

RETRACTABLE CABLE DEVICE

CROSS-REFERENCE TO RELATED APPLICATION

The present application is based on, and claims priority from, China Patent Application No. 202320045182.9, filed Jan. 4, 2023, the disclosure of which is hereby incorporated by reference herein in its entirety.

BACKGROUND OF THE INVENTION

1. Field of the Invention

The present invention generally relates to a retractable cable device, and more particularly to a retractable cable device which moves in a straight line, simplifies mechanical components, and has a simplified structure, a simplified assembly and a lower cost.

2. The Related Art

Generally, there are kinds of network cables. In order to ensure that devices are connected, a user usually choose and purchase a longer network cable to connect the devices. When the longer network cable is connected with the devices, the longer network cable is arranged in disorder, and the longer network cable is easily intertwined together. A neat arrangement and an artistic arrangement of the retractable network cable are affected, and simultaneously, a lot of inconveniences are brought to the retractable network cable in use and in storage, so a lot of retractable network cables are emerged on the market. The retractable network cable is stretched in use. The retractable network cable is retracted when the retractable network cable is unused. The retractable network cable is easy to be settled.

A conventional retractable network cable includes an outer shell, and a middle shell disposed in the outer shell. A network cable is mounted around the middle shell. A bottom end of the middle shell is equipped with a fastening plate. The fastening plate has a metal contacting point along an up-to-down direction. A bottom end of the fastening plate is assembled with a circuit board. The circuit board has a golden finger and a network module. The golden finger of the circuit board is corresponding to the metal contacting point. The network module of the circuit board is communicated with the golden finger. A core wire of the network cable is connected with the metal contacting point of the fastening plate. The core wire of the network cable is connected with the network module by a cooperation of the metal contacting point and the golden finger. The middle shell is synchronously rotated in the outer shell when the network cable is pulled.

However, the above-mentioned retractable network cable is a coil wire shape. The retractable network cable need adopt a circular motion, the retractable network cable is pulled out after the retractable network cable is rotated for several turns, so the retractable network cable need more force to be pulled. When the retractable network cable used or recycled, the above-mentioned retractable network cable still keeps the coil wire shape. The retractable network cable has a forward rotation function and a reverse rotation function, so an internal structure of the retractable network cable is more complicated. Thus, an internal structure of the retractable network cable is relatively complex, and a relative cost of the retractable network cable is higher.

Thus, it is essential to provide an innovative retractable cable device which moves in a straight line, simplifies mechanical components, and has a simplified structure, a simplified assembly and a lower cost.

SUMMARY OF THE INVENTION

An object of the present invention is to provide a retractable cable device which moves in a straight line, simplifies mechanical components, and has a simplified structure, a simplified assembly and a lower cost. The retractable cable device includes a shell, a cable, a pulley, a spring assembly, and a cover covered to a top of the shell. The shell has a bottom board, a front board and a rear board. The front board and the rear board are disposed to a front end and a rear end of the bottom board, respectively. Two sides of an inner surface of the bottom board extend upward to form two first slide rails. A middle of the inner surface of the bottom board is recessed downward to form a first sliding groove. The first sliding groove is disposed between the two first slide rails. The cable is disposed in the shell. Two opposite ends of the cable are exposed out of the front board and the rear board, respectively. The pulley is disposed in the shell. The cable is mounted around the pulley. Two sides of a top surface and two sides of a bottom surface of the pulley are recessed inward to form a plurality of locating grooves. The locating grooves of the bottom surface of the pulley guide the first slide rails of the shell. Two middles of the top surface and the bottom surface of the pulley extend outward to form two protruding portions, respectively. The protruding portion of the bottom surface of the pulley is slidable in the first sliding groove. A rear end of the pulley extends rearward to form a tail portion. One side surface of the tail portion extends sideward to form a protrusion. The spring assembly is disposed in the shell. The spring assembly is disposed between the pulley and the rear board. One end of the spring assembly is fastened to the protrusion of the pulley. Two sides of a bottom surface of the cover extend downward to form two second slide rails. A middle of the bottom surface of the cover is recessed inward to form a second sliding groove. The second sliding groove is disposed between the two second slide rails. The locating grooves of the top surface of the pulley guide the second slide rails of the cover. The protruding portion of the top surface of the pulley is slidable in the second sliding groove.

Another object of the present invention is to provide a retractable cable device. The retractable cable device includes a shell, a cover, a pulley, a spring assembly, and a cable disposed in the shell. The shell has a bottom board. A front end of the bottom board has a front board, a rear end of the bottom board has a rear board, and two opposite sides of the bottom board have two side boards. Two sides of an inner surface of the bottom board extend upward to form two first slide rails. The two first slide rails are extended between the front board and the rear board. A middle of the inner surface of the bottom board is recessed downward to form a first sliding groove. The first sliding groove is disposed between the two first slide rails. The inner surface of the bottom board has a plurality of locating pillars. The plurality of the locating pillars are disposed along the two side boards, and the plurality of the locating pillars keep distances from the two side boards. The inner surface of the bottom board has a fastening pillar. The cover is covered to a top of the shell. Two sides of a bottom surface of the cover extend downward to form two second slide rails. A middle of the bottom surface of the cover is recessed inward to form a second sliding groove. The second sliding groove is disposed between the two second slide rails. The two second slide rails are corresponding to the two first slide rails. The second sliding groove is corresponding to the first sliding groove. The pulley is disposed in the shell. Two sides of each of a top surface and a bottom surface of the pulley are recessed inward to form two locating grooves. The two locating grooves of the bottom surface of the pulley guide the two first slide rails. The two locating grooves of the top surface of the pulley guide the two second slide rails. Two middles of the top surface and the bottom surface of the pulley extend outward to form two protruding portions, respectively. The protruding portion of the bottom surface of the pulley is slidable in the first sliding groove. The protruding portion of the top surface of the pulley is slidable in the second sliding groove. The spring assembly is disposed in the shell. The spring assembly is disposed between the pulley and the rear board. The spring assembly has a shaft center and a coil spring. The shaft center is connected with the bottom board. The coil spring is mounted around the shaft center. One end of the coil spring stretches close to the fastening pillar, and the one end of the coil spring is connected with the pulley. The cable is mounted around the pulley. Two opposite ends of the cable are exposed out of the front board and the rear board, respectively. A tail end of the cable is clamped in a clearance which is formed among the plurality of the locating pillars and one side board. A free end of the cable passes frontward through the clearance. The free end of the cable is bent rearward, and then the free end of the cable is bent frontward and is mounted around the pulley, and the free end of the cable is further exposed out of the shell.

Another object of the present invention is to provide a retractable cable device. The retractable cable device includes a shell, a cover, a pulley, a spring assembly, and a cable disposed in the shell. The shell has a front board, a rear board opposite to the front board, a bottom board, two side boards, a plurality of locating pillars, two first fastening pillars, two second fastening pillars and a third fastening pillar. The front board and the rear board are disposed to a front end and a rear end of the bottom board, respectively. Two sides of an inner surface of the bottom board extend upward to form two first slide rails. The two first slide rails are extended between the front board and the rear board. A middle of the inner surface of the bottom board is recessed downward to form a first sliding groove. The first sliding groove is disposed between the two first slide rails. The two side boards are disposed to two opposite sides of the bottom board, respectively. The plurality of the locating pillars are protruded upward from the inner surface of the bottom board. The plurality of the locating pillars are disposed in the shell, and the plurality of the locating pillars are positioned between the front board and the rear board. The two first fastening pillars are positioned in the shell and close to the front board. The two second fastening pillars are positioned in the shell and close to the rear board. The third fastening pillar is positioned in the shell, and the third fastening pillar is positioned between the two second fastening pillars and the rear board. The cover is covered to a top of the shell. Two sides of a bottom surface of the cover extend downward to form two second slide rails. A middle of the bottom surface of the cover is recessed inward to form a second sliding groove. The second sliding groove is disposed between the two second slide rails. The two second slide rails are corresponding to the two first slide rails. The second sliding groove is corresponding to the first sliding groove. The pulley is disposed in the shell. The pulley is straightly slid between the front board and the rear board. Two sides of each of a top surface and a bottom surface of the pulley are recessed inward to form two locating grooves. The two locating grooves of the bottom surface of the pulley guide the two first slide rails. The two locating grooves of the top surface of the pulley guide the two second slide rails. Two middles of the top surface and the bottom surface of the pulley extend outward to form two protruding portions, respectively. The protruding portion of the bottom surface of the pulley is slidable in the first sliding groove. The protruding portion of the top surface of the pulley is slidable in the second sliding groove. A rear end of the pulley extends rearward to form a tail portion. One side surface of the tail portion extends sideward to form a protrusion. The spring assembly is disposed in the shell. The spring assembly is disposed between the pulley and the rear board. The spring assembly has a hollow shaft center and a coil spring. The hollow shaft center is mounted around the third fastening pillar. The coil spring is mounted around the shaft center. One end of the coil spring stretches close to the two second fastening pillars, the one end of the coil spring is located between the two second fastening pillars, and the one end of the coil spring is connected with the protrusion of the pulley. The cable is disposed in the shell. Two opposite ends of the cable are exposed out of the front board and the rear board, respectively. One end of the cable is positioned close to the two first fastening pillars. The one end of the cable is located between the two first fastening pillars. The cable has a still bending portion mounted around the plurality of the locating pillars, and a movable bending portion mounted around the pulley. The still bending portion is disposed among the plurality of the locating pillars and one side board.

As described above, the retractable cable device has an innovative structure design, the pulley is connected with the spring assembly, the cable is mounted around the pulley. When a plug of the cable is pulled outward, the pulley moves towards the front board, the spring assembly is pulled. When the cable is released, the coil spring of the spring assembly drives the wire of the cable and the pulley to return to original positions. In addition, the cable is a network cable, a USB cable, a headphone cable and a power cable. The retractable cable device applies the spring assembly to perform a linear motion, so the retractable cable device simplifies mechanical components, and the retractable cable device has a simplified structure, a simplified assembly and a lower cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
FIG. 1 is a perspective view of a retractable cable device in accordance with a preferred embodiment of the present invention.
Figure 1:
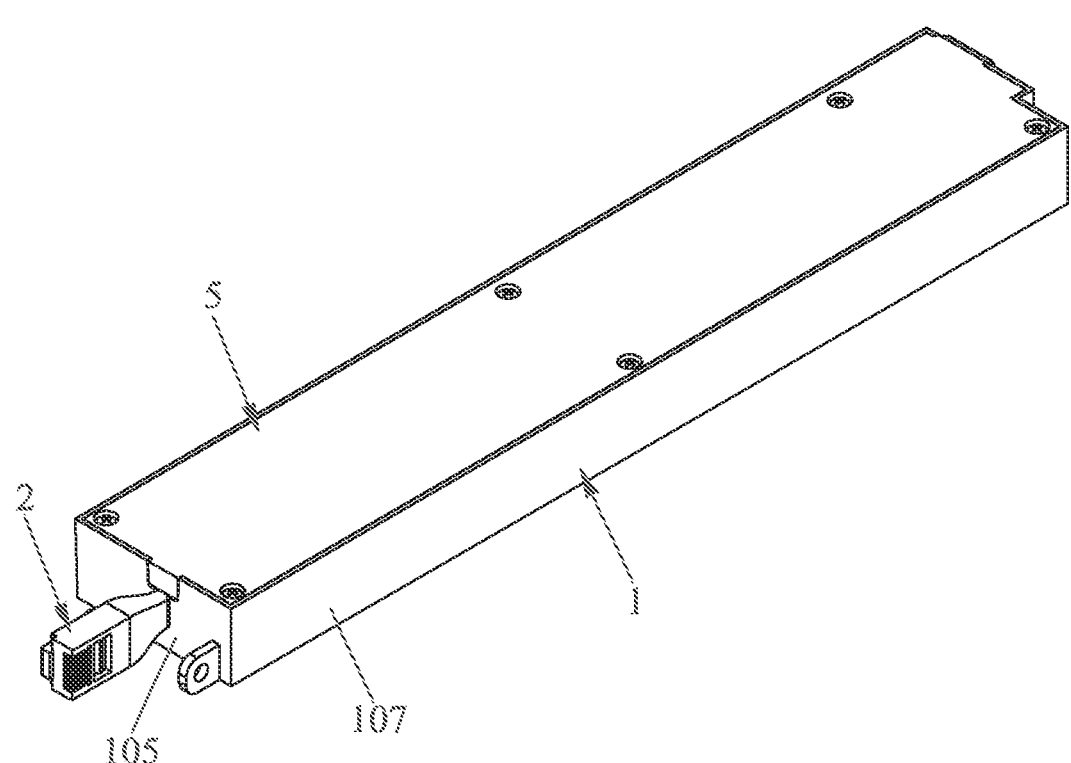
Figure 2:
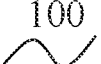
FIG. 2 is another perspective view of the retractable cable device of FIG. 1.
Figure 2:
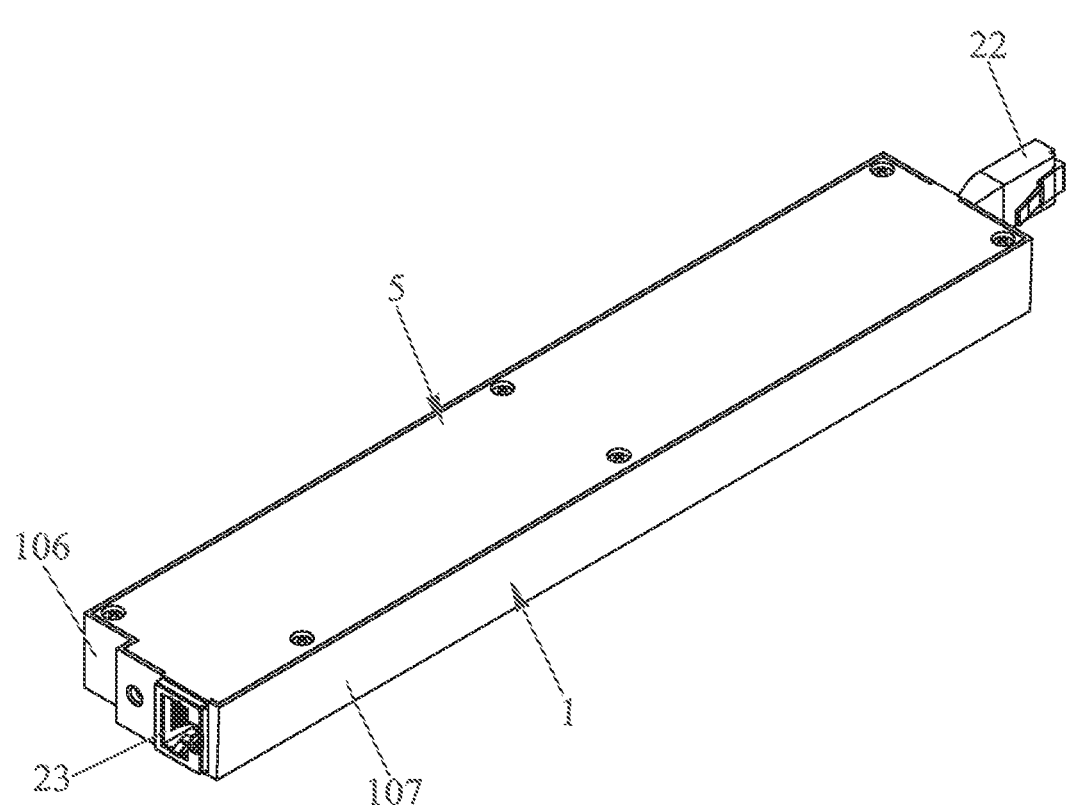
Figure 3:
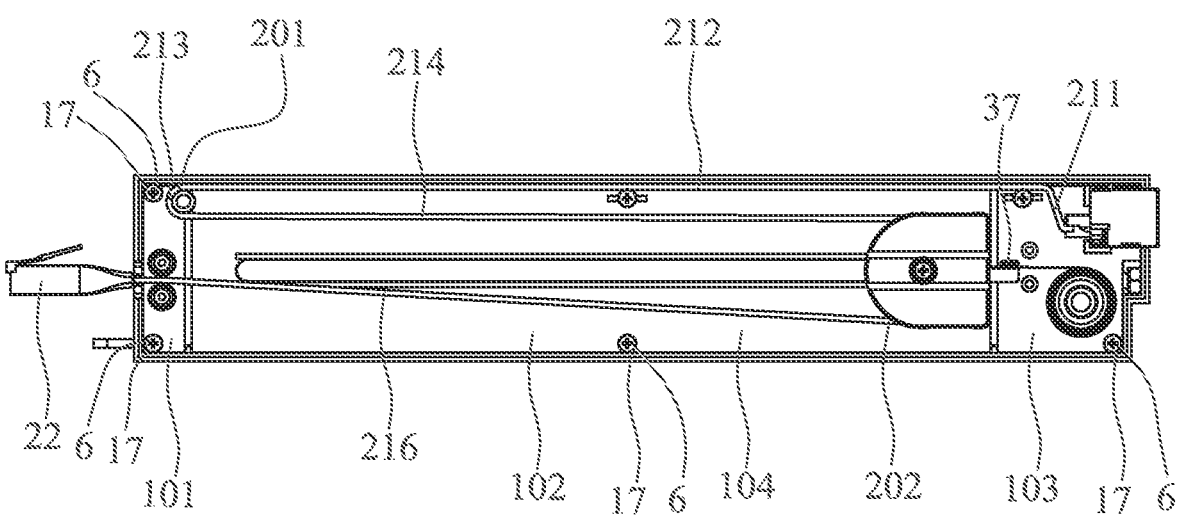
FIG. 3 is a side view of the retractable cable device of FIG. 1.

With reference to FIG. 1 to FIG. 6, a retractable cable device 100 in accordance with a preferred embodiment of the present invention is shown. The retractable cable device 100 includes a shell 1, a cable 2, a pulley 3, a spring assembly 4 and a cover 5.

The cable 2, the pulley 3 and the spring assembly 4 are disposed in the shell 1. Two opposite ends of the cable 2 are exposed out of a front surface and a rear surface of the shell 1. The cable 2 is mounted around the pulley 3. The spring assembly 4 is fastened to a rear end of the pulley 3. The cover 5 is covered to a top of the shell 1. In practice, the cable 2 is a network cable, a universal serial bus (USB) cable, a headphone cable and a power cable.

Referring to FIG. 1 to FIG. 6, the shell 1 has a bottom board 104, a front board 105, a rear board 106 opposite to the front board 105, and two side boards 107. The front board 105 and the rear board 106 are disposed to a front end and a rear end of the bottom board 104, respectively. The two side boards 107 are disposed to two opposite sides of the bottom board 104, respectively. So the front end of the bottom board 104 has the front board 105, the rear end of the bottom board 104 has the rear board 106, and the two opposite sides of the bottom board 104 have the two side boards 107. The two side boards 107 are connected between the front board 105 and the rear board 106. Two opposite ends of the cable 2 are exposed out of the front board 105 and the rear board 106, respectively.

An inside of the shell 1 has a first rib 10, a second rib 11, two first fastening pillars 12, a second fastening pillar 13, a third fastening pillar 14, a first locating pillar 15, two hollow second locating pillars 16, a plurality of hollow third locating pillars 17, a concave groove 18, a mounting portion 19, two first slide rails 111 and a first sliding groove 112. The two first fastening pillars 12 are positioned in the shell 1 and are close to the front board 105. In the preferred embodiment, the inside of the shell 1 has two second fastening pillars 13. The two second fastening pillars 13 are positioned in the shell 1 and are close to the rear board 106. The third fastening pillar 14 is positioned in the shell 1, and the third fastening pillar 14 is positioned between the two second fastening pillars 13 and the rear board 106. One end of an inner surface of the bottom board 104 of the shell 1 extends upward to form the first rib 10. The other end of the inner surface of the bottom board 104 of the shell 1 extends upward to form the second rib 11. A position of the first rib 10 is close to the front board 105. A position of the second rib 11 is close to the rear board 106. The first rib 10 and the second rib 11 are close to the front end and the rear end of the bottom board 104, respectively. The first rib 10 keeps a distance from the front board 105. The second rib 11 keeps a distance from the rear board 106. The shell 1 is separated into a front portion 101, a middle portion 102 and a rear portion 103 by the first rib 10 and the second rib 11. An area between the front board 105 and the first rib 10 is defined as the front portion 101. An area between the first rib 10 and the second rib 11 is defined as the middle portion 102. An area between the second rib 11 and the rear board 106 is defined as the rear portion 103.

The inner surface of the bottom board 104 has a fastening pillar 120. The inner surface of the bottom board 104 extends upward to form the fastening pillar 120. Two portions of the inner surface of the bottom board 104 extend upward to form the two first fastening pillars 12. The two first fastening pillars 12 are disposed in the front portion 101. The retractable cable device 100 further includes two rollers 121. The two rollers 121 are mounted around the two first fastening pillars 12, respectively. The cable 2 penetrates through an interval 108 between the two first fastening pillars 12 to avoid a deviation of the cable 2. The cable 2 is easily driven by the two rollers 121 to be pulled outward. The inner surface of the bottom board 104 has the two second fastening pillars 13 protruded upward. The two second fastening pillars 13 are opposite to the two first fastening pillars 12. The two second fastening pillars 13 are disposed in the rear portion 103.

The spring assembly 4 is disposed in the rear portion 103. The spring assembly 4 is disposed between the pulley 3 and the rear board 106. The spring assembly 4 is disposed among the two second fastening pillars 13 and the rear board 106. The two second fastening pillars 13 are used for preventing an excessively large curl of the spring assembly 4 when the spring assembly 4 is pulled. The two second fastening pillars 13 ensure that the spring assembly 4 is able to be operated in a straight line. The inner surface of the bottom board 104 extends upward to form the third fastening pillar 14. The third fastening pillar 14 is disposed in the rear portion 103. The spring assembly 4 is mounted around the third fastening pillar 14. In the preferred embodiment, the rear board 106 of the shell 1 is closer to the third fastening pillar 14 than to the two second fastening pillars 13. The two first fastening pillars 12, the two second fastening pillars 13 and the third fastening pillar 14 form a plurality of the fastening pillars 120. The plurality of the fastening pillars 120 are disposed in the shell 1.

The inner surface of the bottom board 104 extends upward to form the first locating pillar 15. The first locating pillar 15 is disposed in the front portion 101. The first locating pillar 15 is disposed on a corner of the inner surface of the bottom board 104 which is between the front board 105 and one side board 107. The first locating pillar 15 is close to the one side board 107. The first locating pillar 15 keeps a distance from the one side board 107. The first locating pillar 15 keeps a distance from the other side board 107. Two portions of one side of the inner surface of the bottom board 104 of the shell 1 extend upward to form the two second locating pillars 16. Tops of the two second locating pillars 16 are opened freely. The two second locating pillars 16 are close to the one side board 107. The two second locating pillars 16 keep distances from the one side board 107. The two second locating pillars 16 and the first locating pillar 15 are close to the same one side board 107. The two second locating pillars 16 are disposed in the middle portion 102 and the rear portion 103, respectively. In the preferred embodiment, a distance between the first locating pillar 15 and the one side board 107 is the same as a distance between each second locating pillar 16 and the one side board 107. A clearance 109 is formed among the first locating pillar 15, the two second locating pillars 16 and the one side board 107. The cable 2 passes through the clearance 109, and the cable 2 is disposed among the first locating pillar 15, the two second locating pillars 16 and the one side board 107, so that a deviation of the cable 2 is avoided in a pulling process of the cable 2. The cable 2 has a still bending portion 201 and a movable bending portion 202. The still bending portion 201 is mounted around the first locating pillar 15 and the two second locating pillars 16. The movable bending portion 202 is mounted around the pulley 3. The still bending portion 201 is disposed among the first locating pillar 15, the two second locating pillars 16 and the one side board 107. One end of the cable 2 is connected with the movable bending portion 202, and the other end of the cable 2 is connected with the still bending portion 201.

Several portions of a periphery of the inner surface of the bottom board 104 extend upward to form the plurality of the third locating pillars 17. Tops of the plurality of the third locating pillars 17 are opened freely. The plurality of the third locating pillars 17 are disposed close to the front board 105, the rear board 106 and the two side boards 107. The plurality of the third locating pillars 17 are corresponding to a corresponding mechanism of the cover 5. A plurality of screws 6 are fastened in the plurality of the third locating pillars 17 and the corresponding mechanism of the cover 5 to realize that the cover 5 is located to the shell 1, and the cover 5 is fastened to the shell 1. The first locating pillar 15, the two second locating pillars 16 and the plurality of the third locating pillars 17 form a plurality of locating pillars 150. The plurality of the locating pillars 150 are protruded upward from the inner surface of the bottom board 104. The plurality of the locating pillars 150 are disposed in the shell 1. The plurality of the locating pillars 150 are positioned between the front board 105 and the rear board 106. The inner surface of the bottom board 104 has the plurality of the locating pillars 150. The plurality of the locating pillars 150 are disposed along the two side boards 107, and the plurality of the locating pillars 150 keep distances from the two side boards 107. A tail end of the cable 2 is clamped in the clearance 109 which is formed among the plurality of the locating pillars 150 and the one side board 107, a free end of the cable 2 passes frontward through the clearance 109, the free end of the cable 2 is bent rearward, and then the free end of the cable 2 is bent frontward and is mounted around the pulley 3, and the free end of the cable 2 is further exposed out of the shell 1. The still bending portion 201 is mounted around the plurality of the locating pillars 150. The still bending portion 201 is disposed among the plurality of the locating pillars 150 and the one side board 107.

A top edge of the front board 105 is recessed downward to form the concave groove 18. In the preferred embodiment, the concave groove 18 is a T shape structure. The concave groove 18 has an assembly groove 181 and a wire groove 182. A middle of the top edge of the front board 105 is recessed downward to form the assembly groove 181. In the preferred embodiment, the assembly groove 181 penetrates through the top edge of the front board 105, an inner surface of the front board 105 and an outer surface of the front board 105. A corresponding structure of the cover 5 is buckled with the assembly groove 181 to realize that the cover 5 is located to the shell 1, and the cover 5 is fastened to the shell 1. A middle of a bottom of the assembly groove 181 extends downward to form the wire groove 182. In the preferred embodiment, the wire groove 182 penetrates through the inner surface of the front board 105 and the outer surface of the front board 105. The wire groove 182 is communicated with the assembly groove 181. The cable 2 penetrates through the wire groove 182.

One side of the rear portion 103 of the shell 1 is recessed downward to form the mounting portion 19 penetrating through the rear board 106 along a longitudinal direction. The mounting portion 19 has a notch 191, a concave surface 192 and a peripheral wall 193. A corresponding position of the cable 2 is disposed in the mounting portion 19. The notch 191 penetrates through a top edge, an inner surface and an outer surface of the rear board 106. The corresponding position of the cable 2 penetrates through the notch 191 and is exposed out of the rear board 106. The inner surface of the bottom board 104 is recessed downward to form the concave surface 192. The concave surface 192 is connected to the notch 191. The corresponding position of the cable 2 is disposed in the concave surface 192. The peripheral wall 193 is protruded upward from a periphery of the concave surface 192. The peripheral wall 193 is disposed around the concave surface 192. The peripheral wall 193 is used for fastening the corresponding position of the cable 2.

Two sides of the inner surface of the bottom board 104 extend upward to form the two first slide rails 111. The two first slide rails 111 are disposed in the middle portion 102. The two first slide rails 111 extend along the longitudinal direction. The two first slide rails 111 are extended between the front board 105 and the rear board 106. The two first slide rails 111 are parallel to the two side boards 107. The two first slide rails 111 are corresponding to two corresponding zones of the pulley 3. The middle of the inner surface of the bottom board 104 is recessed downward to form the first sliding groove 112. The first sliding groove 112 is disposed in the middle portion 102. The first sliding groove 112 is disposed between the two first slide rails 111. A corresponding location of the pulley 3 is disposed in the first sliding groove 112.

The cable 2 has a wire 21, a plug 22 and a socket 23. The plug 22 and the socket 23 are disposed to a front end and a rear end of the wire 21, respectively. The one end of the cable 2 is positioned close to the two first fastening pillars 12. The one end of the cable 2 is located between the two first fastening pillars 12. The wire 21 is disposed in the shell 1. A part of the wire 21 is disposed in the clearance 109 among the first locating pillar 15, the two second locating pillars 16 and the one side board 107 of the shell 1. In the preferred embodiment, the cable 2 is continuously bent to form a bending structure. The wire 21 has a first connecting portion 211, a first extending portion 212, a first bending portion 213, a second extending portion 214, a second bending portion 215, a third extending portion 216 and a second connecting portion 217.

One end of the wire 21 is connected with the socket 23, and the one end of the wire 21 forms the first connecting portion 211. A portion of the wire 21 penetrates through clearance 109 among the one side board 107, the first locating pillar 15 and the two second locating pillars 16 of the shell 1 to form the first extending portion 212. The first bending portion 213 of the wire 21 is formed around the first locating pillar 15. The second extending portion 214 of the wire 21 is formed between the first locating pillar 15 and the pulley 3. The second bending portion 215 of the wire 21 is formed around the pulley 3. The third extending portion 216 of the wire 21 is formed between the pulley 3 and the plug 22. The other end of the wire 21 is connected with the plug 22 to form the second connecting portion 217. The third extending portion 216 is extended between the pulley 3 and the second connecting portion 217.

When the retractable cable device 100 is unused, the first connecting portion 211 is disposed in the rear portion 103 of the shell 1. One end of the first connecting portion 211 is connected with the socket 23. The other end of the first connecting portion 211 extends towards the front board 105 of the shell 1 to form the first extending portion 212. The first extending portion 212 is disposed among the one side board 107, the first locating pillar 15 and the two second locating pillars 16. The first extending portion 212 is clamped among the one side board 107, the first locating pillar 15 and the two second locating pillars 16. Two opposite surfaces of the first extending portion 212 abut against the one side board 107, the first locating pillar 15 and the two second locating pillars 16. One side surface of the first extending portion 212 abuts against the one side board 107. The other side surface of the first extending portion 212 abuts against the first locating pillar 15 and the two second locating pillars 16. The first extending portion 212 is disposed in the middle portion 102 of the shell 1.

One end of the first extending portion 212 is further bent towards the rear board 106 of the shell 1 to form the first bending portion 213. The first bending portion 213 is disposed in the front portion 101 of the shell 1. The first bending portion 213 is disposed to one side of the first locating pillar 15. The first bending portion 213 is mounted around one end of the first locating pillar 15 facing towards the front board 105. A free end of the first bending portion 213 extends rearward to form the second extending portion 214. The second extending portion 214 is disposed in the middle portion 102 of the shell 1. A free end of the second extending portion 214 is bent towards the front board 105 of the shell 1 to form the second bending portion 215. The second bending portion 215 is disposed in the middle portion 102 of the shell 1. The second bending portion 215 is mounted around a corresponding place of the pulley 3. One end of the second bending portion 215 extends towards the front board 105 of the shell 1 to form the third extending portion 216. A free end of the third extending portion 216 is connected with the second connecting portion 217. The second connecting portion 217 is connected with the plug 22. The second connecting portion 217 interconnects the plug 22 and the third extending portion 216.

Figure 4:
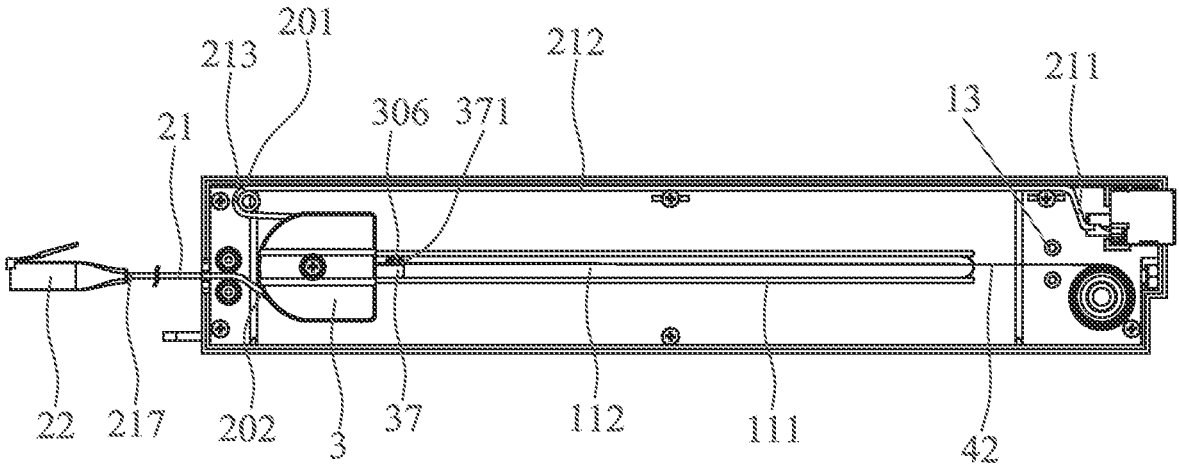
FIG. 4 is another side view of the retractable cable device of FIG. 1, wherein a cable of the retractable cable device is stretched to a maximum length.
Figure 5:
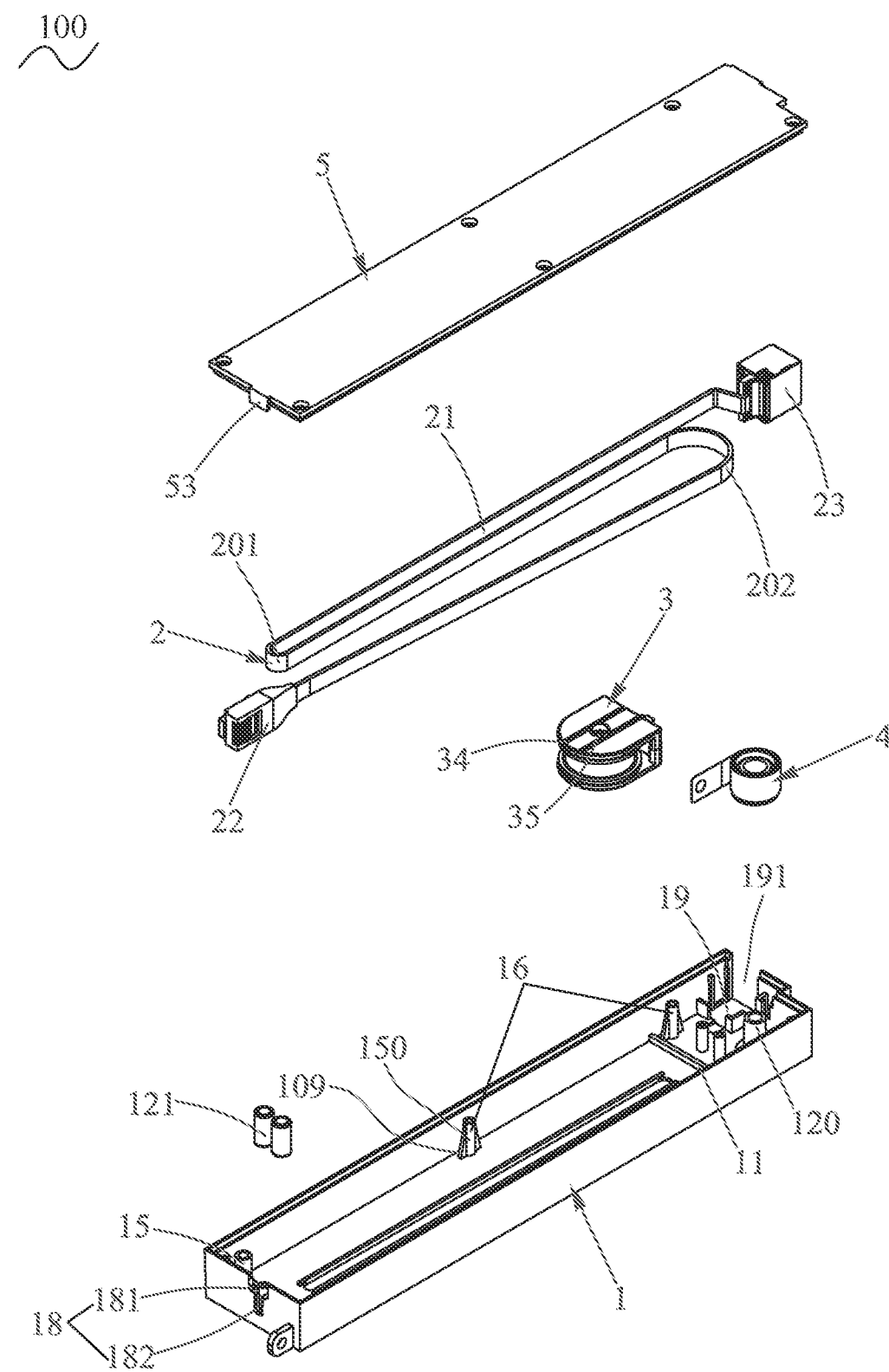
FIG. 5 is an exploded view of the retractable cable device of FIG. 1.
Figure 6:
FIG. 6 is another exploded view of the retractable cable device of FIG. 1.
Figure 6:
Figure 7:
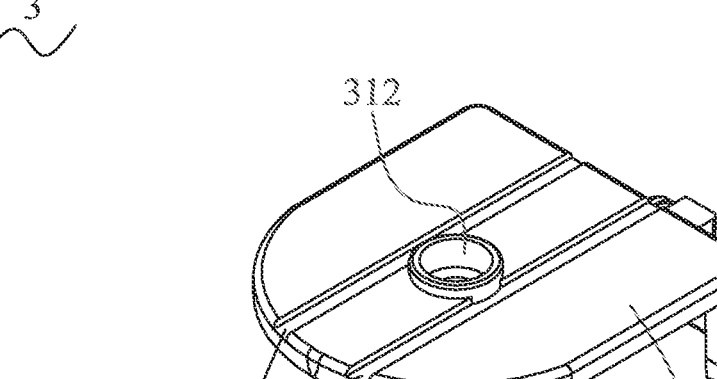
FIG. 7 is an exploded view of a pulley of the retractable cable device of FIG. 1.
Figure 7:
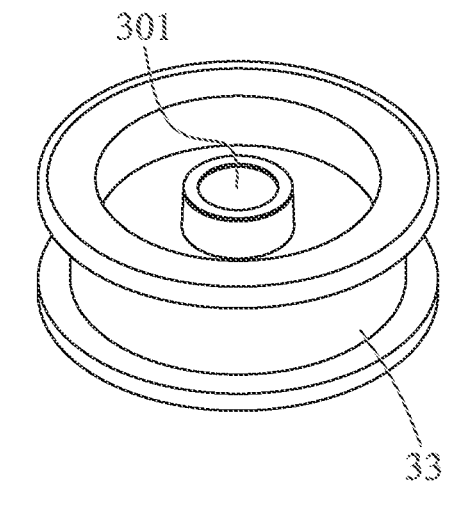
Figure 7:
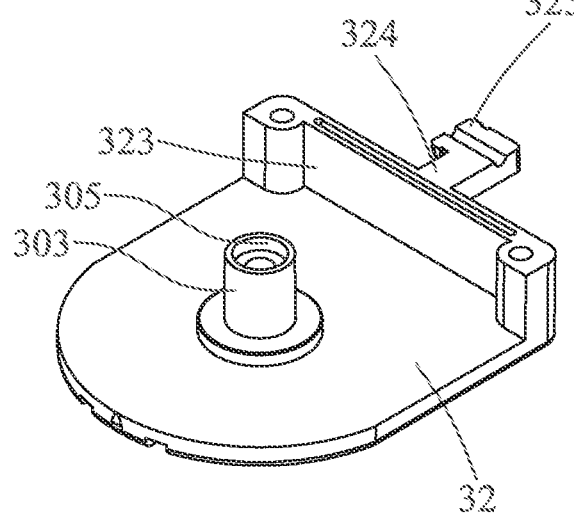
Figure 8:
FIG. 8 is another exploded view of the pulley of the retractable cable device of FIG. 1.
Figure 8:
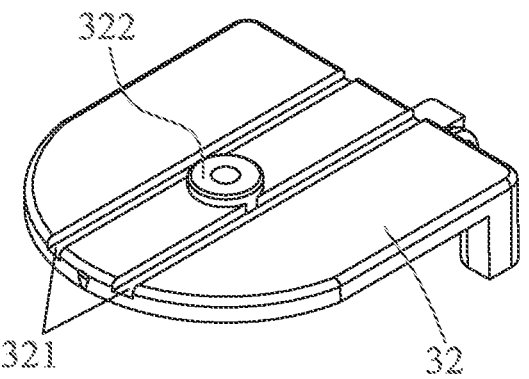
Figure 8:
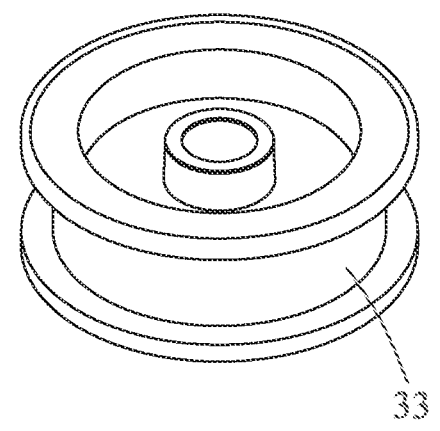
Figure 8:
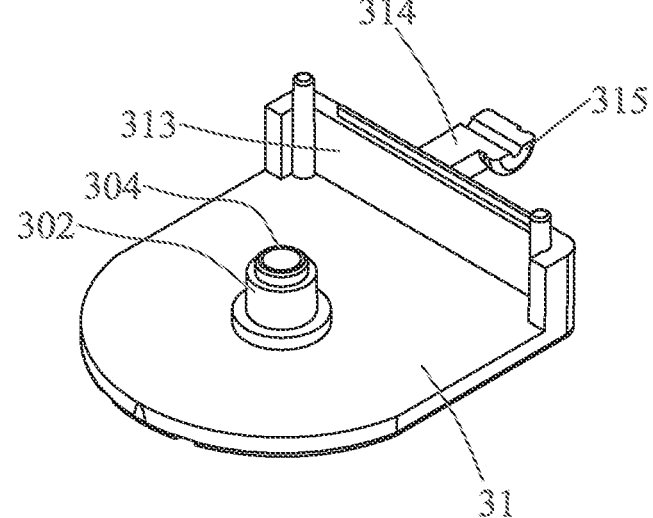
Figure 9:
FIG. 9 is a perspective view of a cover of the retractable cable device of FIG. 1.
Figure 9:
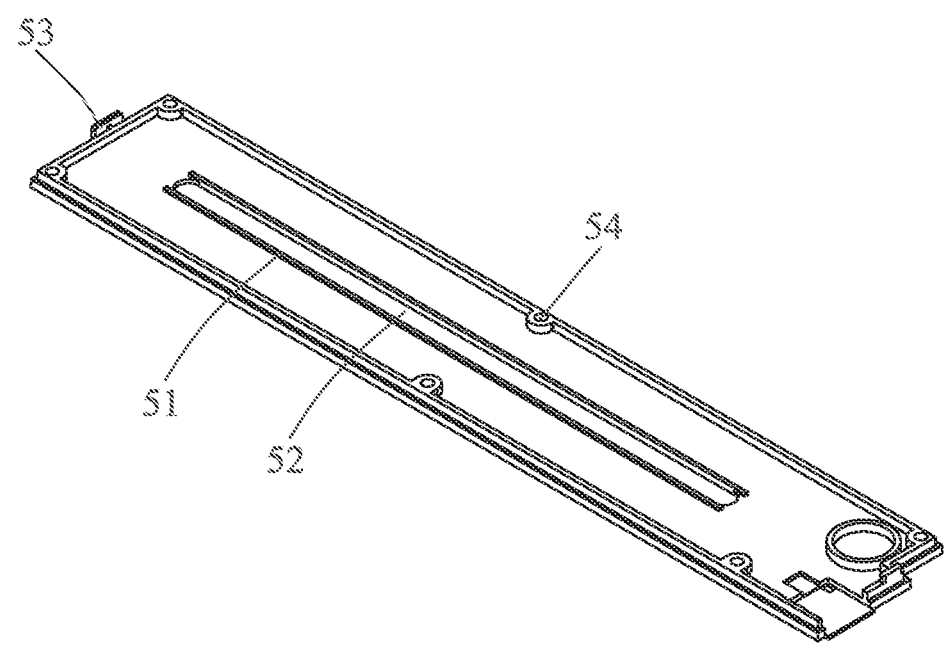

Referring to FIG. 4, when the retractable cable device 100 is pulled, a position of the second extending portion 214, a position of the second bending portion 215 and a position of the third extending portion 216 are changed according to a stretching length of the cable 2. In the preferred embodiment, the wire 21 is a flat wire or a round wire. In the preferred embodiment, a pullable length of the wire 21 is 300 millimeters. In a concrete implementation, the wire 21 is without being limited to be the flat wire or the round wire. The pullable length of the wire 21 is without being limited to be 300 millimeters.

Referring to FIG. 1 to FIG. 4, the plug 22 is disposed to the one end of the wire 21. The socket 23 is disposed to the other end of the wire 21. The wire 21 is disposed in the shell 1. The wire 21 is disposed in the wire groove 182 of the concave groove 18, and the wire 21 penetrates outward through the wire groove 182. The plug 22 is exposed out of the front board 105 of the shell 1. The socket 23 is exposed out of the rear board 106 of the shell 1. In the preferred embodiment, a width of the plug 22 is wider than a width of the wire groove 182, so the plug 22 is fastened to an outside of the front board 105 of the shell 1, and the plug 22 is unable to retract into the shell 1 through the wire groove 182.

In the preferred embodiment, the width of the wire groove 182 is wider than a width of the wire 21, when the cable 2 is pulled, the wire 21 is stably pulled out, so that a friction between the wire 21 and the wire groove 182 of the shell 1 is prevented to damage the wire 21. The other end of the wire 21 is soldered with the socket 23 by a soldering technology. The socket 23 is disposed in the mounting portion 19 of the shell 1. The socket 23 is disposed on the concave surface 192 of the mounting portion 19 of the shell 1. The peripheral wall 193 is disposed around the socket 23. The socket 23 is exposed out of the rear board 106 of the shell 1 through the notch 191 of the mounting portion 19. In the preferred embodiment, the socket 23 projects outward two millimeters from the rear board 106 of the shell 1. In a concrete implement, the socket 23 is without being limited to project outward two millimeters from the rear board 106 of the shell 1.

Referring to FIG. 3 to FIG. 8, the pulley 3 is disposed in the middle portion 102 of the shell 1. The pulley 3 is straightly slid between the front board 105 and the rear board 106. The pulley 3 has an upper cover 31, a lower cover 32 and a belt reel 33. The belt reel 33 is disposed between the upper cover 31 and the lower cover 32. The wire 21 is mounted around the belt reel 33. The second bending portion 215 of the wire 21 of the cable 2 is mounted around the belt reel 33. The upper cover 31 is covered with the lower cover 32. The upper cover 31 is buckled with the lower cover 32.

The upper cover 31 has two upper locating grooves 311, an upper protruding portion 312, an upper rear wall 313, an upper tail portion 314 and an upper protrusion 315. Two sides of a top surface of the upper cover 31 are recessed downward to form the two upper locating grooves 311. Corresponding sections of the cover 5 are disposed in the two upper locating grooves 311. A middle of the top surface of the upper cover 31 extends upward to form the upper protruding portion 312. The upper protruding portion 312 is disposed between the two upper locating grooves 311. The upper protruding portion 312 is disposed in a corresponding sector of the cover 5. A rear end of a bottom surface of the upper cover 31 extends downward to form the upper rear wall 313. A middle of the bottom surface of the upper cover 31 protrudes downward to form an upper protruding pillar 302. A middle of a bottom surface of the upper protruding pillar 302 protrudes downward to form an insertion portion 304. The upper protruding portion 312 is located over the upper protruding pillar 302. A rear surface of the upper rear wall 313 extends rearward to form the upper tail portion 314. One side surface of a tail end of the upper tail portion 314 extends sideward to form the upper protrusion 315. A corresponding construction of the spring assembly 4 is fastened to the upper protrusion 315 of the upper cover 31 to realize that the upper cover 31 is located to the spring assembly 4, and the upper cover 31 is fastened to the spring assembly 4.

The lower cover 32 has two lower locating grooves 321, a lower protruding portion 322, a lower rear wall 323, a lower tail portion 324 and a lower protrusion 325. Two sides of a bottom surface of the lower cover 32 are recessed inward to form the two lower locating grooves 321. A middle of the bottom surface of the lower cover 32 extends downward to form the lower protruding portion 322. The lower protruding portion 322 is disposed between the two lower locating grooves 321. A rear end of a top surface of the lower cover 32 extends upward to form the lower rear wall 323. A middle of the top surface of the lower cover 32 protrudes upward to form a lower protruding pillar 303. A middle of a top surface of the lower protruding pillar 303 is recessed downward to form an insertion hole 305. The lower protruding portion 322 is located under the lower protruding pillar 303. A rear surface of the lower rear wall 323 extends rearward to form the lower tail portion 324. One side surface of a tail end of the lower tail portion 324 extends sideward to form the lower protrusion 325. The corresponding construction of the spring assembly 4 is fastened to the lower protrusion 325 to realize that the lower cover 32 is located to the spring assembly 4, and the lower cover 32 is fastened to the spring assembly 4. The two first slide rails 111 of the shell 1 are disposed in the two lower locating grooves 321. The lower protruding portion 322 is slidably disposed in the first sliding groove 112 of the shell 1. When the plug 22 of the cable 2 is pulled outward, the lower cover 32 slides towards the front board 105 of the shell 1, the lower protruding portion 322 moves towards the front board 105 of the shell 1 along the first sliding groove 112 of the shell 1, and the two first slide rails 111 of the shell 1 are guided in the two lower locating grooves 321.

In the preferred embodiment, the upper rear wall 313 and the lower rear wall 323 are bucked with each other. The upper tail portion 314 and the lower tail portion 324 are connected with each other. The upper protrusion 315 and the lower protrusion 325 are corresponding to each other. In the preferred embodiment, the two upper locating grooves 311 and the two lower locating grooves 321 form a plurality of locating grooves 34. The upper protruding portion 312 and the lower protruding portion 322 form two protruding portions 35. The upper tail portion 314 and the lower tail portion 324 form a tail portion 36. The upper protrusion 315 and the lower protrusion 325 form a protrusion 37. A middle of the protrusion 37 of the pulley 3 has a fixing hole 371 transversely penetrating through the protrusion 37. A middle of the belt reel 33 has a penetrating hole 301 vertically penetrating through the belt reel 33. The upper protruding pillar 302 and the lower protruding pillar 303 pass through the penetrating hole 301. The upper protruding pillar 302 and the lower protruding pillar 303 are matched with each other. The insertion portion 304 of the upper protruding pillar 302 is inserted into the insertion hole 305 of the lower protruding pillar 303. The bottom surface of the upper protruding pillar 302 abuts against the top surface of the lower protruding pillar 303. A peripheral surface of the upper protruding pillar 302 is aligned with a peripheral surface of the lower protruding pillar 303.

Two sides of a top surface and two sides of a bottom surface of the pulley 3 are recessed inward to form the plurality of the locating grooves 34. Two sides of each of the top surface and the bottom surface of the pulley 3 are recessed inward to form two locating grooves 34. Two middles of the top surface and the bottom surface of the pulley 3 extend outward to form the two protruding portions 35, respectively. A rear end of the pulley 3 extends rearward and towards the rear board 106 of the shell 1 to form the tail portion 36. One side surface of the tail portion 36 extends sideward to form the protrusion 37. In the preferred embodiment, the two locating grooves 34 of the bottom surface of the pulley 3 are corresponding to the two first slide rails 111 of the shell 1. The two locating grooves 34 of the bottom surface of the pulley 3 guide the two first slide rails 111 of the shell 1. The protruding portion 35 of the bottom surface of the pulley 3 is corresponding to the first sliding groove 112 of the shell 1. The two locating grooves 34 of the top surface of the pulley 3 are corresponding to the corresponding sections of the cover 5. The protruding portion 35 of the top surface of the pulley 3 is corresponding to the corresponding sector of the cover 5.

Referring to FIG. 3 to FIG. 6, the spring assembly 4 is disposed in the rear portion 103 of the shell 1. One end of the spring assembly 4 is fastened to the protrusion 37 of the pulley 3. The other end of the spring assembly 4 is mounted around the third fastening pillar 14. The spring assembly 4 has a hollow shaft center 41 and a coil spring 42. The fastening pillar 120 is disposed near the coil spring 42. The shaft center 41 is mounted around the fastening pillar 120. The hollow shaft center 41 is mounted around the third fastening pillar 14 of the shell 1. The coil spring 42 is mounted around the shaft center 41. One end of the coil spring 42 stretches close to the fastening pillar 120, and the one end of the coil spring 42 is connected with the pulley 3. The one end of the coil spring 42 stretches close to the two second fastening pillars 13. The one end of the coil spring 42 is located between the two second fastening pillars 13. The one end of the coil spring 42 is connected with the protrusion 37 of the pulley 3. In the preferred embodiment, the shaft center 41 is a rotating structure. The shaft center 41 is connected with the bottom board 104 of the shell 1. A tail end of the coil spring 42 defines a first location hole 43 penetrating through two side surfaces of the coil spring 42. The first location hole 43 is corresponding to the fixing hole 371. A fixing element 306 is inserted into the first location hole 43 and the fixing hole 371, so the tail end of the coil spring 42 is fastened to the protrusion 37 of the pulley 3.

Referring to FIG. 1 and FIG. 4, when the plug 22 of the cable 2 is pulled outward, the pulley 3 moves towards the front board 105 of the shell 1. The tail end of the coil spring 42 is connected with the protrusion 37 of the pulley 3, so the coil spring 42 is stretched to drive the shaft center 41 to rotate. When the coil spring 42 is stretched, the two second fastening pillars 13 of the shell 1 are disposed near the coil spring 42. The tail end of the coil spring 42 is located between the two second fastening pillars 13 of the shell 1. Two sides of the tail end of the coil spring 42 is located near the two second fastening pillars 13 of the shell 1. The two second fastening pillars 13 prevents an excessively large curl of the coil spring 42 of the spring assembly 4 when the coil spring 42 of the spring assembly 4 is pulled, the two second fastening pillars 13 ensure that the coil spring 42 of the spring assembly 4 is operated straightly. When the cable 2 is released, the coil spring 42 drives the wire 21 of the cable 2 and the pulley 3 to return to original positions. The retractable cable device 100 applies the spring assembly 4 to perform a linear motion, so the retractable cable device 100 moves in a straight line, the retractable cable device 100 simplifies mechanical components, and the retractable cable device 100 has a simplified structure, a simplified assembly and a lower cost.

Referring to FIG. 3 to FIG. 9, the cover 5 has two second slide rails 51, a second sliding groove 52, a protruding block 53 and a plurality of second location holes 54. Two sides of a bottom surface of the cover 5 extend downward to form the two second slide rails 51. In the preferred embodiment, the two second slide rails 51 are corresponding to the two upper locating grooves 311 of the upper cover 31 of the top surface of the pulley 3. The two second slide rails 51 are disposed in the two upper locating grooves 311 of the upper cover 31, respectively. A middle of the bottom surface of the cover 5 is recessed inward to form the second sliding groove 52. The second sliding groove 52 is disposed between the two second slide rails 51. In the preferred embodiment, the second sliding groove 52 is corresponding to the protruding portion 35 of the top surface of the pulley 3. The upper protruding portion 312 of the upper cover 31 is slidably disposed in the second sliding groove 52. The two second slide rails 51 are corresponding to the two first slide rails 111 of the shell 1. The second sliding groove 52 are corresponding to the first sliding groove 112 of the shell 1. The two locating grooves 34 of the top surface of the pulley 3 guide the two second slide rails 51 of the cover 5. The protruding portion 35 of the top surface of the pulley 3 is slidable in the second sliding groove 52.

When the cable 2 is pulled, the pulley 3 moves frontward and towards the front board 105 of the shell 1, the upper protruding portion 312 of the upper cover 31 moves frontward along the second sliding groove 52. One end of the cover 5 extends downward to form the protruding block 53.

The protruding block 53 is buckled in the assembly groove 181 of the concave groove 18 of the shell 1 to realize that the cover 5 is located to the shell 1, and the cover 5 is fixed to the shell 1. The protruding block 53 is fastened in the assembly groove 181 to restrict a position of the plug 22 of the cable 2 to prevent a position deviation of the plug 22. A periphery of the cover 5 has the plurality of the second location holes 54 penetrating through a top surface and the bottom surface of the cover 5. The plurality of the second location holes 54 are corresponding to the two second locating pillars 16 and the plurality of the third locating pillars 17 of the shell 1. The plurality of the screws 6 are fastened in the plurality of the second location holes 54, the two second locating pillars 16 of the shell 1 and the plurality of the third locating pillars 17 to realize that the cover 5 is located to the shell 1, and the cover 5 is fastened to the shell 1.

As described above, the retractable cable device 100 has an innovative structure design, the pulley 3 is connected with the spring assembly 4, the cable 2 is mounted around the pulley 3. When the plug 22 of the cable 2 is pulled outward, the pulley 3 moves towards the front board 105, the spring assembly 4 is pulled. When the cable 2 is released, the coil spring 42 of the spring assembly 4 drives the wire 21 of the cable 2 and the pulley 3 to return to the original positions. In addition, the cable 2 is the network cable, the USB cable, the headphone cable and the power cable. The retractable cable device 100 applies the spring assembly 4 to perform the linear motion, so the retractable cable device 100 simplifies the mechanical components, and the retractable cable device 100 has the simplified structure, the simplified assembly and the lower cost.

What is claimed is:

1. A retractable cable device, comprising:
a shell having a bottom board, a front board and a rear board, the front board and the rear board being disposed to a front end and a rear end of the bottom board, respectively, two sides of an inner surface of the bottom board extending upward to form two first slide rails, a middle of the inner surface of the bottom board being recessed downward to form a first sliding groove, the first sliding groove being disposed between the two first slide rails;
a cable disposed in the shell, two opposite ends of the cable being exposed out of the front board and the rear board, respectively;
a pulley disposed in the shell, the cable being mounted around the pulley, two sides of a top surface and two sides of a bottom surface of the pulley being recessed inward to form a plurality of locating grooves, the locating grooves of the bottom surface of the pulley guiding the first slide rails of the shell, two middles of the top surface and the bottom surface of the pulley extending outward to form two protruding portions, respectively, the protruding portion of the bottom surface of the pulley being slidable in the first sliding groove, a rear end of the pulley extending rearward to form a tail portion, one side surface of the tail portion extending sideward to form a protrusion;
a spring assembly disposed in the shell, the spring assembly being disposed between the pulley and the rear board, one end of the spring assembly being fastened to the protrusion of the pulley; and
a cover covered to a top of the shell, two sides of a bottom surface of the cover extending downward to form two second slide rails, a middle of the bottom surface of the cover being recessed inward to form a second sliding groove, the second sliding groove being disposed between the two second slide rails, the locating grooves of the top surface of the pulley guiding the second slide rails of the cover, the protruding portion of the top surface of the pulley being slidable in the second sliding groove.

2. The retractable cable device as claimed in claim 1, wherein the spring assembly has a hollow shaft center and a coil spring, the coil spring is mounted around the shaft center, a tail end of the coil spring defines a first location hole penetrating through two side surfaces of the coil spring, a middle of the protrusion has a fixing hole transversely penetrating through the protrusion, the first location hole is corresponding to the fixing hole, a fixing element is inserted into the first location hole and the fixing hole, so the tail end of the coil spring is fastened to the protrusion of the pulley.

3. The retractable cable device as claimed in claim 2, wherein two portions of the inner surface of the bottom board extend upward to form two first fastening pillars, the cable penetrates through an interval between the two first fastening pillars, the inner surface of the bottom board has two second fastening pillars protruded upward, the two second fastening pillars are opposite to the two first fastening pillars, the spring assembly is disposed among the two second fastening pillars and the rear board, the inner surface of the bottom board extends upward to form a third fastening pillar, the shaft center is mounted around the third fastening pillar, the rear board of the shell is closer to the third fastening pillar than to the two second fastening pillars.

4. The retractable cable device as claimed in claim 3, wherein the pulley has an upper cover, a lower cover and a belt reel, the belt reel is disposed between the upper cover and the lower cover, the cable is mounted around the belt reel, the upper cover is covered with the lower cover, the upper cover is buckled with the lower cover, two sides of a top surface of the upper cover are recessed downward to form two upper locating grooves, the two second slide rails are disposed in the two upper locating grooves, respectively, a middle of the top surface of the upper cover extends upward to form an upper protruding portion, the upper protruding portion is disposed between the two upper locating grooves, the upper protruding portion is slidably disposed in the second sliding groove.

5. The retractable cable device as claimed in claim 4, wherein a rear end of a bottom surface of the upper cover extends downward to form an upper rear wall, a rear surface of the upper rear wall extends rearward to form an upper tail portion, one side surface of a tail end of the upper tail portion extends sideward to form an upper protrusion, a rear end of a top surface of the lower cover extends upward to form a lower rear wall, a rear surface of the lower rear wall extends rearward to form a lower tail portion, one side surface of a tail end of the lower tail portion extends sideward to form a lower protrusion, the upper tail portion and the lower tail portion are connected with each other, the upper protrusion and the lower protrusion are corresponding to each other, the upper tail portion and the lower tail portion form the tail portion, the upper protrusion and the lower protrusion form the protrusion.

6. The retractable cable device as claimed in claim 4, wherein two sides of a bottom surface of the lower cover are recessed inward to form two lower locating grooves, the two first slide rails are disposed in the two lower locating grooves, a middle of the bottom surface of the lower cover extends downward to form a lower protruding portion, the lower protruding portion is disposed between the two lower locating grooves, the lower protruding portion is slidably disposed in the first sliding groove, the two upper locating grooves and the two lower locating grooves form the plurality of the locating grooves, the upper protruding portion and the lower protruding portion form the two protruding portions.

7. The retractable cable device as claimed in claim 6, wherein the cable has a wire, a plug and a socket, the wire is disposed in the shell, the wire is mounted around the belt reel, the plug and the socket are disposed to a front end and a rear end of the wire, respectively, the plug is exposed out of the front board of the shell, the socket is exposed out of the rear board of the shell.

8. The retractable cable device as claimed in claim 7, wherein the shell has two side boards, the two side boards are disposed to two opposite sides of the bottom board, respectively, the two side boards are connected between the front board and the rear board, the inner surface of the bottom board extends upward to form a first locating pillar, the first locating pillar is disposed in the front portion, the first locating pillar is disposed on a corner of the inner surface of the bottom board which is between the front board and one side board, two portions of one side of the inner surface of the bottom board extend upward to form two second locating pillars, the two second locating pillars and the first locating pillar are close to the same one side board, a distance between the first locating pillar and the one side board is the same as a distance between each second locating pillar and the one side board, a part of the wire is disposed in a clearance among the first locating pillar, the two second locating pillars and the one side board of the shell.

9. The retractable cable device as claimed in claim 8, wherein the wire has a first connecting portion, a first extending portion, a first bending portion, a second extending portion, a second bending portion, a third extending portion and a second connecting portion, one end of the first connecting portion is connected with the socket, the other end of the first connecting portion extends towards the front board to form the first extending portion, the first extending portion is disposed among the one side board, the first locating pillar and the two second locating pillars, one end of the first extending portion is further bent towards the rear board to form the first bending portion, the first bending portion is mounted around one end of the first locating pillar facing towards the front board, a free end of the first bending portion extends rearward to form the second extending portion, a free end of the second extending portion is bent towards the front board to form the second bending portion, the second bending portion is mounted around the belt reel, one end of the second bending portion extends towards the front board to form the third extending portion, a free end of the third extending portion is connected with the second connecting portion, the second connecting portion interconnects the plug and the third extending portion.

10. The retractable cable device as claimed in claim 8, wherein several portions of a periphery of the inner surface of the bottom board extend upward to form a plurality of third locating pillars, the plurality of the third locating pillars are disposed close to the front board, the rear board and the two side boards, a periphery of the cover has a plurality of second location holes penetrating through a top surface and the bottom surface of the cover, the plurality of the second location holes are corresponding to the two second locating pillars and the plurality of the third locating pillars.

11. The retractable cable device as claimed in claim 1, wherein a top edge of the front board is recessed downward to form a concave groove, the concave groove is a T shape structure, the concave groove has an assembly groove and a wire groove, a middle of the top edge of the front board is recessed downward to form the assembly groove, the assembly groove penetrates through the top edge of the front board, an inner surface of the front board and an outer surface of the front board, a middle of a bottom of the assembly groove extends downward to form the wire groove, the wire groove penetrates through the inner surface of the front board and the outer surface of the front board, the wire groove is communicated with the assembly groove, one end of the cover extends downward to form a protruding block, the protruding block is buckled in the assembly groove, the cable has a wire, the wire is disposed in the wire groove, and the wire penetrates outward through the wire groove.

12. The retractable cable device as claimed in claim 1, wherein one side of a rear portion of the shell is recessed downward to form a mounting portion penetrating through the rear board along a longitudinal direction, the socket is disposed in the mounting portion, the mounting portion has a notch, a concave surface and a peripheral wall, the notch penetrates through a top edge, an inner surface and an outer surface of the rear board, the inner surface of the bottom board is recessed downward to form the concave surface, the peripheral wall is disposed around the concave surface.

13. A retractable cable device, comprising:
a shell having a bottom board, a front end of the bottom board having a front board, a rear end of the bottom board having a rear board, and two opposite sides of the bottom board having two side boards, two sides of an inner surface of the bottom board extending upward to form two first slide rails, the two first slide rails being extended between the front board and the rear board, a middle of the inner surface of the bottom board being recessed downward to form a first sliding groove, the first sliding groove being disposed between the two first slide rails, the inner surface of the bottom board having a plurality of locating pillars, the plurality of the locating pillars being disposed along the two side boards, and the plurality of the locating pillars keeping distances from the two side boards, the inner surface of the bottom board having a fastening pillar;
a cover covered to a top of the shell, two sides of a bottom surface of the cover extending downward to form two second slide rails, a middle of the bottom surface of the cover being recessed inward to form a second sliding groove, the second sliding groove being disposed between the two second slide rails, the two second slide rails being corresponding to the two first slide rails, the second sliding groove being corresponding to the first sliding groove;
a pulley disposed in the shell, two sides of each of a top surface and a bottom surface of the pulley being recessed inward to form two locating grooves, the two locating grooves of the bottom surface of the pulley guiding the two first slide rails, the two locating grooves of the top surface of the pulley guiding the two second slide rails, two middles of the top surface and the bottom surface of the pulley extending outward to form two protruding portions, respectively, the protruding portion of the bottom surface of the pulley being slidable in the first sliding groove, the protruding portion of the top surface of the pulley being slidable in the second sliding groove;
a spring assembly disposed in the shell, the spring assembly being disposed between the pulley and the rear board, the spring assembly having a shaft center and a coil spring, the shaft center being connected with the bottom board, the coil spring being mounted around the shaft center, one end of the coil spring stretching close to the fastening pillar, and the one end of the coil spring being connected with the pulley; and a cable disposed in the shell, the cable being mounted around the pulley, two opposite ends of the cable being exposed out of the front board and the rear board, respectively, a tail end of the cable being clamped in a clearance which is formed among the plurality of the locating pillars and one side board, a free end of the cable passing frontward through the clearance, the free end of the cable being bent rearward, and then the free end of the cable being bent frontward and being mounted around the pulley, and the free end of the cable being further exposed out of the shell.

14. The retractable cable device as claimed in claim 13, wherein the inner surface of the bottom board extends upward to form the fastening pillar, the fastening pillar is disposed near the coil spring, the spring assembly has the hollow shaft center, the shaft center is mounted around the fastening pillar.

15. The retractable cable device as claimed in claim 13, wherein the inner surface of the bottom board extends upward to form the first locating pillar, the first locating pillar is disposed on a corner of the inner surface of the bottom board which is between the front board and the one side board, the first locating pillar is close to the one side board, two portions of one side of the inner surface of the bottom board extend upward to form two second locating pillars, the two second locating pillars and the first locating pillar are close to the same one side board, a distance between the first locating pillar and the one side board is the same as a distance between each second locating pillar and the one side board, the cable is disposed among the first locating pillar, the two second locating pillars and the one side board, several portions of a periphery of the inner surface of the bottom board extend upward to form a plurality of third locating pillars, the plurality of the third locating pillars are disposed close to the front board, the rear board and the two side boards, the first locating pillar, the two second locating pillars and the plurality of the third locating pillars form the plurality of the locating pillars.

16. A retractable cable device, comprising:

a shell, having:

a front board;

a rear board opposite to the front board;

a bottom board, the front board and the rear board being disposed to a front end and a rear end of the bottom board, respectively, two sides of an inner surface of the bottom board extending upward to form two first slide rails, the two first slide rails being extended between the front board and the rear board, a middle of the inner surface of the bottom board being recessed downward to form a first sliding groove, the first sliding groove being disposed between the two first slide rails;

two side boards disposed to two opposite sides of the bottom board, respectively;

a plurality of locating pillars protruded upward from the inner surface of the bottom board, the plurality of the locating pillars being disposed in the shell, and the plurality of the locating pillars being positioned between the front board and the rear board;

two first fastening pillars positioned in the shell and close to the front board;

two second fastening pillars positioned in the shell and close to the rear board; and a third fastening pillar positioned in the shell, and the third fastening pillar being positioned between the two second fastening pillars and the rear board;

a cover covered to a top of the shell, two sides of a bottom surface of the cover extending downward to form two second slide rails, a middle of the bottom surface of the cover being recessed inward to form a second sliding groove, the second sliding groove being disposed between the two second slide rails, the two second slide rails being corresponding to the two first slide rails, the second sliding groove being corresponding to the first sliding groove;

a pulley disposed in the shell, the pulley being straightly slid between the front board and the rear board, two sides of each of a top surface and a bottom surface of the pulley being recessed inward to form two locating grooves, the two locating grooves of the bottom surface of the pulley guiding the two first slide rails, the two locating grooves of the top surface of the pulley guiding the two second slide rails, two middles of the top surface and the bottom surface of the pulley extending outward to form two protruding portions, respectively, the protruding portion of the bottom surface of the pulley being slidable in the first sliding groove, the protruding portion of the top surface of the pulley being slidable in the second sliding groove, a rear end of the pulley extending rearward to form a tail portion, one side surface of the tail portion extending sideward to form a protrusion;

a spring assembly disposed in the shell, the spring assembly being disposed between the pulley and the rear board, the spring assembly having:

a hollow shaft center mounted around the third fastening pillar; and a coil spring mounted around the shaft center, one end of the coil spring stretching close to the two second fastening pillars, the one end of the coil spring being located between the two second fastening pillars, and the one end of the coil spring being connected with the protrusion of the pulley; and a cable disposed in the shell, two opposite ends of the cable being exposed out of the front board and the rear board, respectively, one end of the cable being positioned close to the two first fastening pillars, the one end of the cable being located between the two first fastening pillars, the cable having:

a still bending portion mounted around the plurality of the locating pillars, the still bending portion being disposed among the plurality of the locating pillars and one side board; and a movable bending portion mounted around the pulley.

17. The retractable cable device as claimed in claim 16, wherein the cable is a network cable, a universal serial bus cable, a headphone cable and a power cable.

18. The retractable cable device as claimed in claim 16, wherein one end of the cable is connected with the movable bending portion, the other end of the cable is connected with the still bending portion.

19. The retractable cable device as claimed in claim 16, wherein a tail end of the coil spring defines a first location hole penetrating through two side surfaces of the coil spring, a middle of the protrusion of the pulley has a fixing hole transversely penetrating through the protrusion, a fixing element is inserted into the first location hole and the fixing hole, so the tail end of the coil spring is fastened to the protrusion of the pulley.

20. The retractable cable device as claimed in claim 16, wherein the inner surface of the bottom board extends upward to form a first locating pillar, the first locating pillar is close to the one side board, two portions of one side of the inner surface of the bottom board extend upward to form two second locating pillars, the two second locating pillars are close to the one side board, the still bending portion is mounted around the first locating pillar and the two second locating pillars, the still bending portion is disposed among the first locating pillar, the two second locating pillars and the one side board.

* * * * *